May 2, 1967 P. D. SCHWARZ 3,317,892
CASHIERING CONTROL SYSTEMS FOR COLLECTING FEES FOR VEHICLES
Filed Oct. 21, 1963 6 Sheets-Sheet 1
FIG. I
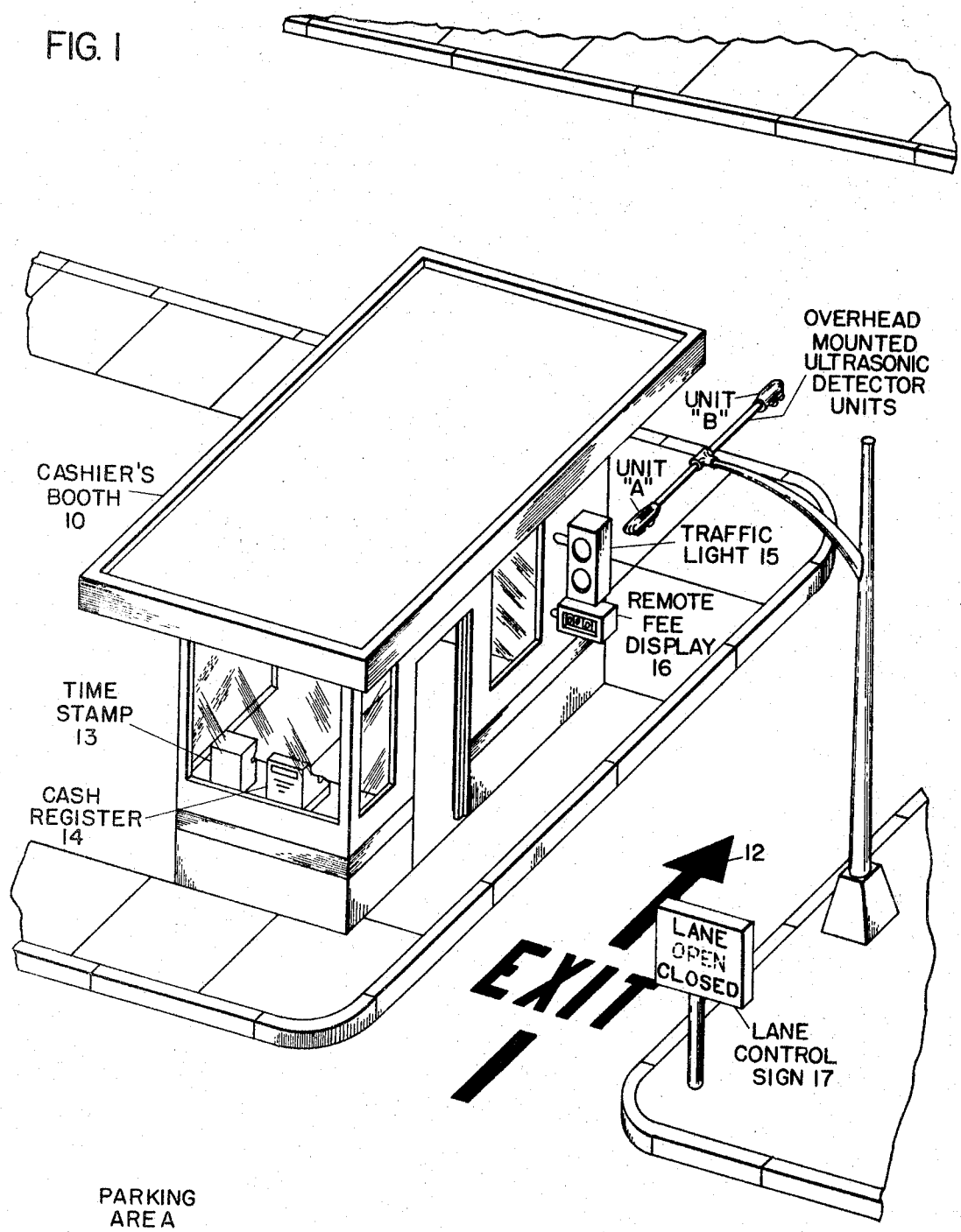
INVENTOR.
P. D. SCHWARZ
BY
Forest B. Whitehead
HIS ATTORNEY

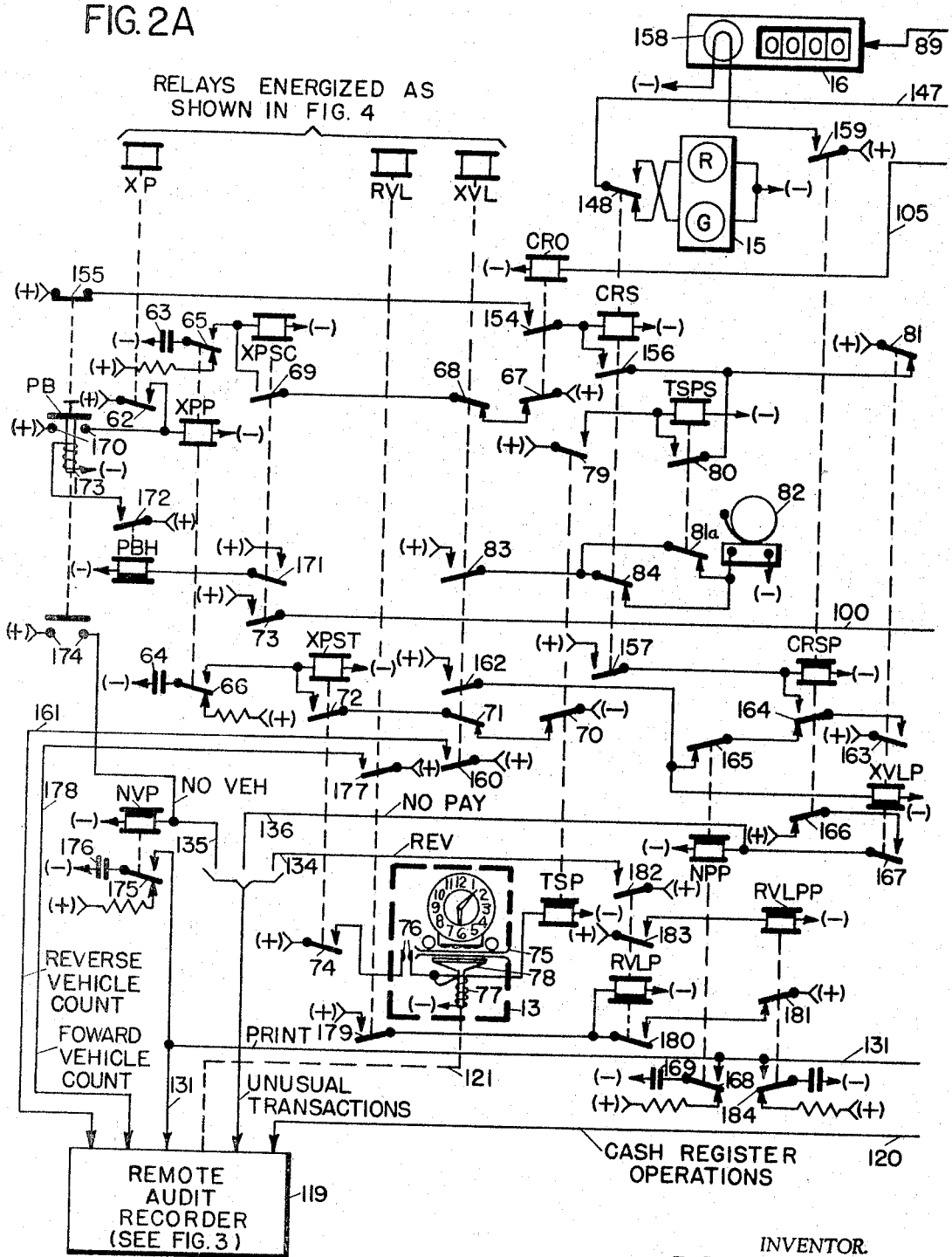

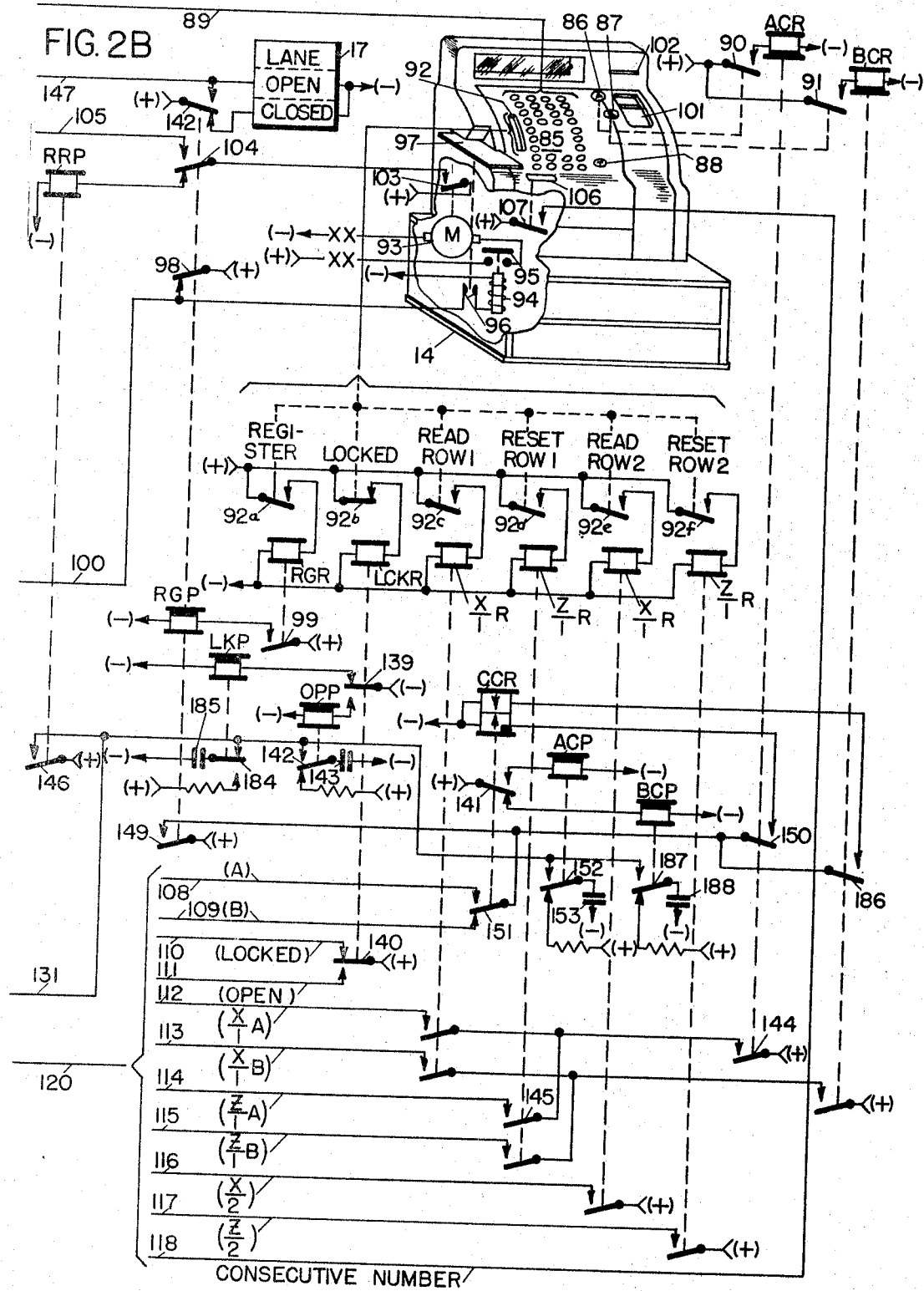

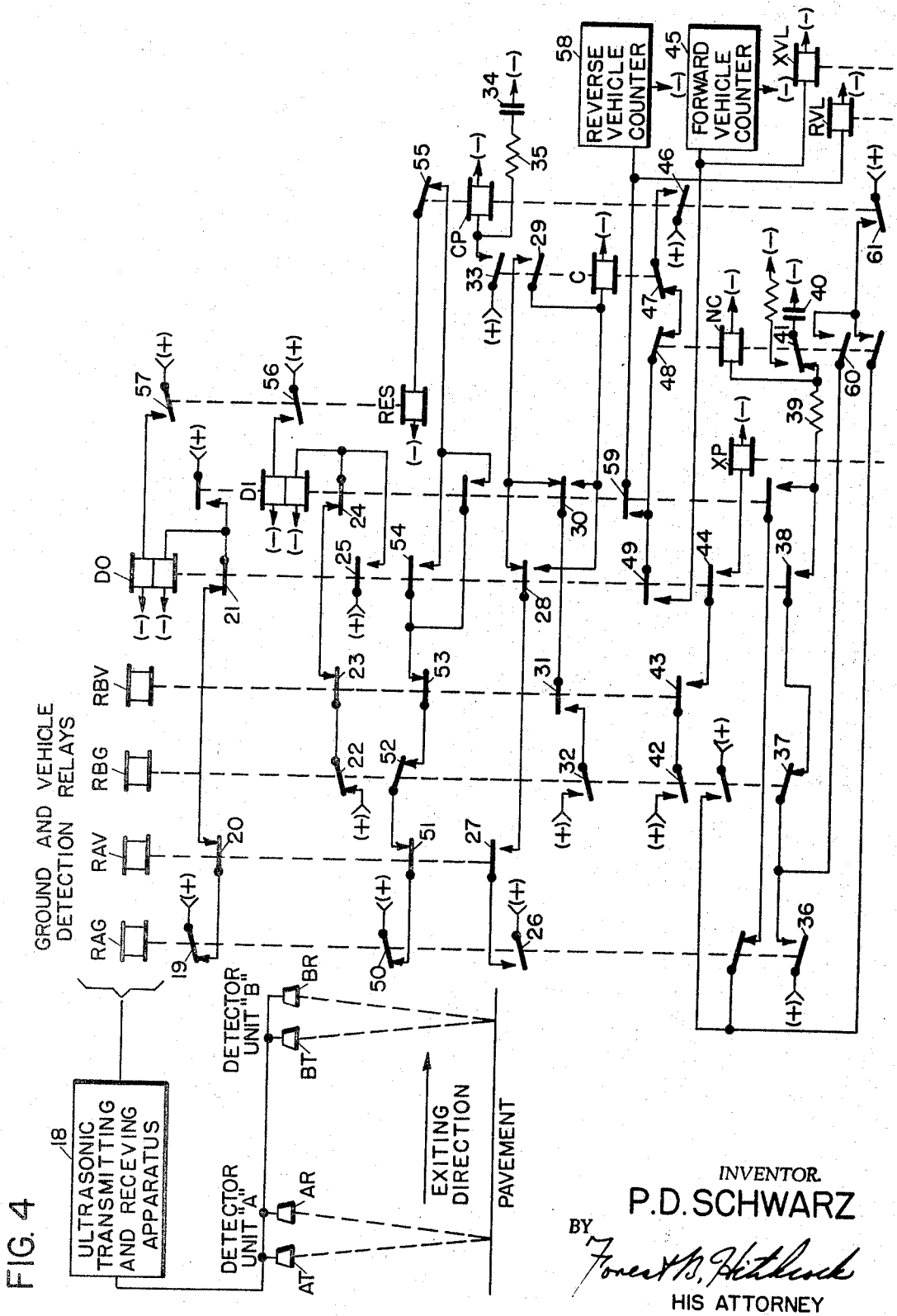

May 2, 1967  P. D. SCHWARZ  3,317,892
CASHIERING CONTROL SYSTEMS FOR COLLECTING FEES FOR VEHICLES
Filed Oct. 21, 1963  6 Sheets-Sheet 6

FIG. 6

TYPICAL SALES JOURNAL PROVIDED BY CASH REGISTER 14 OF FIG. 2B

| CONSECUTIVE NUMBER AND CODE SYMBOL | TRANSACTION |
|---|---|
| 125 | 000.65 B |
| 124 N-1/N | 084.70 A |
| 123 N-1/N | 000.00 B |
| 122 X/2 | 178.35 |
| 121 | 000.80 A |
| 120 | 001.20 A |
| ... | ... |
| 041 | 000.70 A |
| 040 | 001.05 A |
| 039 N-1/N | 021.30 B |
| 038 N-1/N | 000.00 A |
| 037 X/2 | 093.65 |

TYPICAL PRINTED RECORD PROVIDED BY REMOTE AUDIT RECORDER 119 OF FIG. 3

| FORWARD VEHICLES | REVERSE VEHICLES | CODE SYMBOL | CONSECUTIVE NUMBER | TIME | DATE | |
|---|---|---|---|---|---|---|
| 087 | 003 | OPEN | 036 | 0801 | MAY 19 63 | L1 |
| 087 | 003 | X/2 | 037 | 0801 | MAY 19 63 | |
| 087 | 003 | N-1/N | 038 | 0801 | MAY 19 63 | L3 |
| 087 | 003 | N-1/N A | 039 | 0801 | MAY 19 63 | |
| 087 | 003 | B | 040 | 0803 | MAY 19 63 | L5 |
| ... | ... | ... | ... | ... | ... | |
| 103 | 003 | NO PAY | 055 | 0915 | MAY 19 63 | L6 |
| 103 | 003 | NO VEH | 056 | 0916 | MAY 19 63 | L7 |
| 119 | 004 | REV. | 082 | 104 | MAY 19 63 | L8 |
| 158 | 004 | X/2 | 122 | 1603 | MAY 19 63 | |
| 158 | 004 | N-1/N B | 123 | 1603 | MAY 19 63 | L10 |
| 158 | 004 | N-1/N A | 124 | 1603 | MAY 19 63 | |
| 158 | 004 | B | 125 | 1606 | MAY 19 63 | L12 |

INVENTOR.
P. D. SCHWARZ
BY
*Forest B. Hitchcock*
HIS ATTORNEY

3,317,892
CASHIERING CONTROL SYSTEMS FOR COLLECTING FEES FOR VEHICLES
Peter D. Schwarz, Rochester, N.Y., assignor to General Signal Corporation, Rochester, N.Y., a corporation of New York
Filed Oct. 21, 1963, Ser. No. 317,713
17 Claims. (Cl. 340—31)

The present invention generally relates to cashiering control systems and more particularly pertains to the system and apparatus for monitoring and controlling the collection of fees at the cashiering location of a parking facility or the like.

GENERAL PRACTICE AT GARAGE FACILITIES

At parking garages or facilities such as toll roads end the like, it is common practice to employ a cashier at a predetermined exiting location to collect the required parking charge or fee from each vehicle utilizing the facility, as the vehicle exits; the required parking charge for each vehicle normally being commensurate with the elapsed time for which this vehicle has utilized the facility. For the purpose of this application, the payment of a fee will be considered as either payment in cash, or a charge against an account as by the use of a credit card or the like. In addition, such a cashier is also capable of aiding the vehicle drivers in the event of a vehicle breakdown or other emergencies, and furthermore, acts as a deterrent to a driver attempting to leave the facility before payment of the proper fee. Also, where a cashier is employed at the exit of such a parking facility, the vehicle drivers are not required to have the exact change on hand necessary to cover the required parking fee, as is normally the case where completely automatic fee collecting organizations are employed.

In a facility such as discussed above, the driver of the vehicle, upon entering the facility, is normally issued a ticket upon which the entrance time or entrance location for the vehicle is imprinted, and, the total charge or fee is normally then computed in accordance with the time that elapses between entrance and exit of the vehicle at a parking facility, or a fee may be charged for use of a toll road at an exit cashiering location in accordance with distance travelled, for example. Accordingly, but without attempting to limit the applicability of the system provided by the present invention, the selected embodiment thereof has been illustrated as being applied to a parking garage or similar facility wherein it is assumed that a parking, ticket (with entrance time imprinted thereon) is issued to each vehicle entering the facility, for example, by a ticket dispensing machine, and, a suitable time stamping machine is then provided at the exiting or cashiering location of the facility to imprint upon the parking ticket for a vehicle, the exact exiting time so that the cashier may accurately compute the required parking charge to be collected and registered in a suitable cash registering device.

While the employment of a cashier at such an exiting location has many inherent advantages, including those discussed above, the cashier on the other hand may attempt to engage in dishonest practices. For example, without proper surveillance, the cashier may attempt to pocket the parking charge collected from a given customer or else may ring up (on the cash register) less than the total parking charge collected for the vehicle. Furthermore, the cashier may attempt to permit certain vehicles (for example, driven by acquaintances) to utilize the facility either without payment of any fee or for less than the proper parking charge.

DESCRIPTION OF PRESENT INVENTION

In order to protect both customer and management against such surreptitious acts on the part of the cashier, it is considered necessary to continuously monitor and control the cashiering operations at such an exiting location. Accordingly, it is proposed in accordance with the present invention to provide suitable vehicle detecting apparatus mounted at the cashier's location of a parking facility to form a predetermined detection zone and to permit the time stamping apparatus and cash register at such location to be rendered capable of being operated only once for each vehicle detected as being located at the cashier's location (in the detection zone), with directional control also being provided so that this cashiering apparatus can only be operated for vehicles that are detected as travelling in the proper exiting direction past the cashier's location.

At the cashiering location, some customers may attempt to pay their parking charge "on the fly"; i.e. the driver of a vehicle may know his own parking charge and therefore hand his parking ticket and the correct amount of money to the cashier, without stopping. Therefore, the cashier may not have time to operate the time stamp and cash register before the vehicle leaves the detection zone and thus renders the cashier's apparatus inoperative. Therefore, the cashier is also provided with manually operable means whereby he can manually render his apparatus effective for one operation, when no vehicle is present, so as to register the receipt of parking charges for such vehicle.

It is furthermore proposed in accordance with the present invention to provide remote audit recording apparatus which continually monitors and provides a printed record of predetermined events occurring at the cashiering location; which printed record of the remote audit recorder can then be correlated with the conventional sales journal record provided by the cash register to reconstruct the total events of the day in order to uncover any unusual transactions occurring at the cashiering location.

The present invention furthermore proposes to provide various signalling and/or display devices operated in accordance with the condition of the cash register apparatus, at the exiting location of a parking facility, so as to insure proper and efficient control over each vehicle utilizing the facility. For example, an alarm signal is actuated if a vehicle attempts to exit before the cash register has been operated to register receipt of the proper parking charge; a traffic signal is automatically controlled to display a green aspect to the driver of a vehicle only after the required vehicle parking charge has been rung up on the cash register; a remote fee display is provided, to indicate to the vehicle driver the exact vehicle parking charge rung up on the cash register, and thereby acts to discourage the cashier from ringing up less than the exact parking charge collected from the vehicle driver; and, a lane control signal which provides an indication of whether or not vehicles may exit at a particular cashiering location dependent upon whether or not the cash register at that location is in proper condition to register receipt of vehicle parking charges.

In view of the foregoing discussions, a general object of the present invention is to provide a cashiering control system for an exiting location of a parking facility or the like which protects both customer and management against and discourages surreptitious acts on the part of the cashier.

A further object of the present invention is to render the cashiering apparatus at the cashiering location of such a facility capable of being operated only once for each vehicle, while detected at the location, with directional control so that such apparatus can only be operated for vehicles detected as travelling in a predetermined direction.

A more specific object of the present invention is to provide manually operable means whereby a cashier can render his apparatus capable of being operated one time when a vehicle is not detected and thereby permit registration of the receipt of parking charges from vehicles that pay their required fees, without properly stopping at the cashiering location.

Another object of the present invention is to provide remote audit recording apparatus which continually monitors and provides a printed record of predetermined events occurring at the cashiering location, which printed record can be referred to in order to uncover any unusual transactions taking place at the cashiering location.

Another object of the present invention is to render the operation of various vehicle signalling and/or display devices at such a cashiering location directly dependent upon the condition and operation of the cash registering apparatus situated at such location.

Other objects, purposes and characteristic features of the present invention will be in part pointed out as the description of the invention progresses and in part obvious from the accompanying drawings to which reference will be made when describing the invention in detail, and in which:

FIG. 1 is a pictorial representation of a typical cashiering location for a parking garage or the like equipped in accordance with one embodiment of the present invention;

FIGS. 2A and 2B when placed side by side, with FIG. 2B on the right, illustrate in more detail the circuitry provided in accordance with this same embodiment of the present invention;

FIG. 4 illustrates partially in block diagram and partially in detailed circuit form certain vehicle counting and directional control apparatus employed in accordance with this illustrated embodiment of the present invention;

FIG. 5 illustrates a portion of a typical printed record provided by the remote audit recording apparatus of FIG. 3; and FIG. 6 illustrates a portion of a typical sales record or journal provided by the cash registering apparatus employed in accordance with the illustrated embodiment of the present invention.

GENERAL DESCRIPTION

Figure 3:
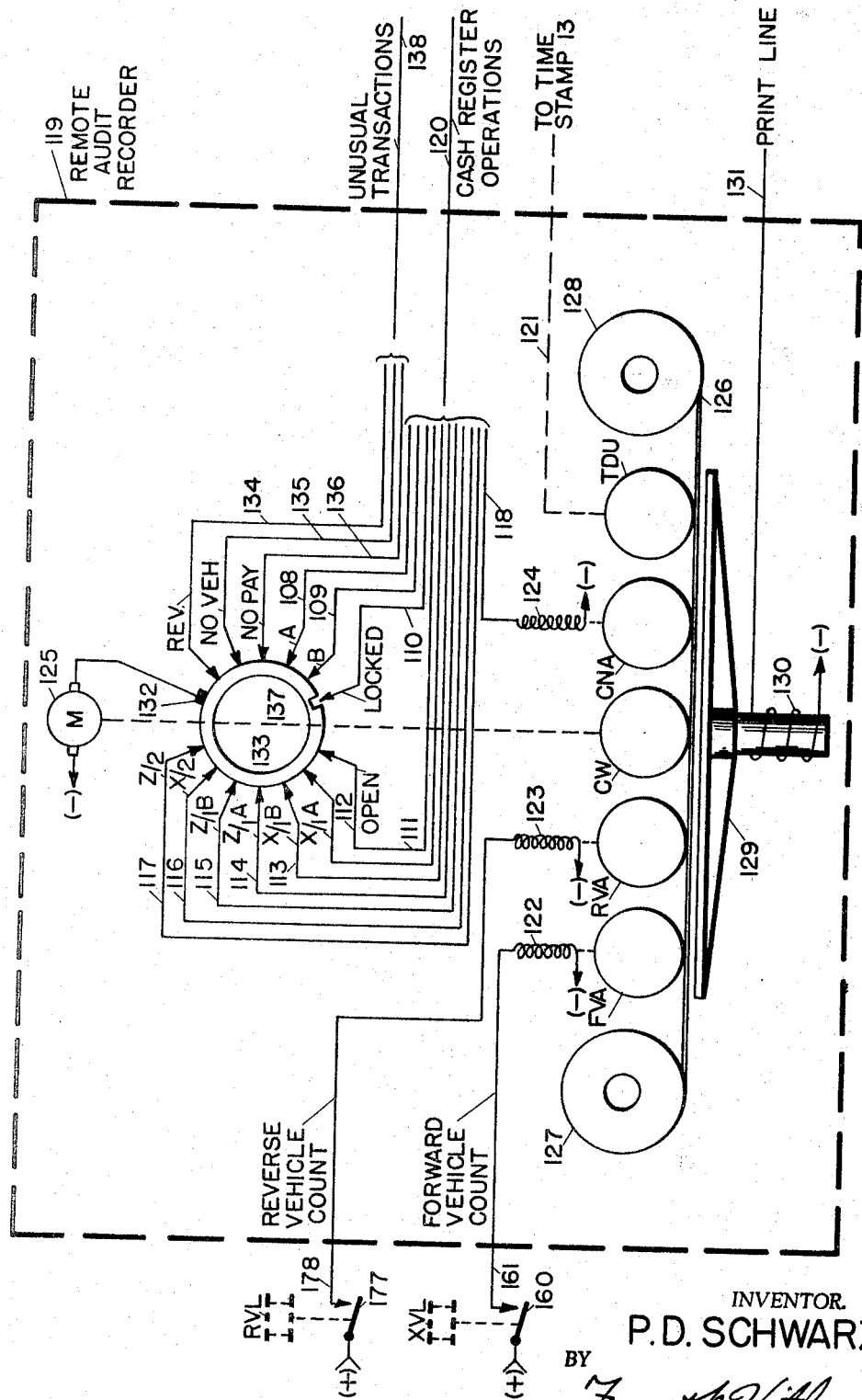
FIG. 3 is a simplified illustration of a typical remote audit recorder employed in accordance with this same embodiment of the present invention.

Referring now to FIG. 1 of the accompanying drawings, a typical cashiering location assumed in accordance with the present invention is illustrated and comprises a cashier's booth 10 situated adjacent an exit lane and wherein a cashier is assumed to be stationed to collect and register receipt of the parking charges for each vehicle when exiting from the illustrated parking area 11 in the direction shown by the arrow 12. Accordingly, a time stamp unit 13 and a cash register 14 are located within the cashier's booth 10 and are utilized, as will be discussed, by the cashier in computing and registering the parking charges for each exiting vehicle.

Two ultrasonic detector units "A" and "B" are mounted over the exiting lane served by the cashier's booth 10 and cooperate with the apparatus of FIG. 4 to detect the presence and direction of travel of each vehicle utilizing this cashier's lane. More particularly, each of the ultrasonic detector units "A" and "B" includes: a transmitting head (for example, as designated by the reference character AT in FIG. 4) which transmits energy pulses of a predetermined frequency towards the ground or pavement; and, a receiving head (for example, as designated by the reference character AR in FIG. 4) which receives these energy pulses after being reflected from either the pavement or a vehicle situated under the detecting unit.

A traffic signal light 15 is illustrated, in FIG. 1, as being mounted on the side of the cashier's booth 10 and is controlled in accordance with the present invention, to provide an indication to the operator of a vehicle exiting from the parking area 11 concerning whether or not he may proceed past the cashiering booth 10, dependent upon whether or not the cashier's apparatus has been properly operated to register receipt of the required vehicle parking charge, as will be discussed in detail hereinafter. A remote fee display 16 is also provided at the cashiering location shown in FIG. 1 and provides to the operator of an exiting vehicle a remote display of the exact parking charges rung up on the cash register 14, as will be discussed in detail hereinafter. Furthermore, a lane control sign 17 is illustrated in FIG. 1 and is also controlled in accordance with the operation of the cash register 14, as will be discussed, to only permit exiting vehicles to utilize the cashiering lane shown in FIG. 1 when the cash register 14 is in proper operating condition to register receipt of the parking charges for such vehicles.

Having thus generally described the apparatus provided at the typical parking garage cashiering location illustrated in FIG. 1, it should be understood at this time that the drawing in FIG. 1 is intended only for illustrative purposes since the control system of the present invention may be employed at any type of cashiering location where it is desirable to monitor and control the cashiering operations. However, before considering the detailed system operation, during monitoring and control of the cashiering operations occurring at the cashier's booth 10 in FIG. 1, a more specific description will be set forth for each of the various portions included in the illustrated embodiment of the present invention.

VEHICLE DETECTION APPARATUS

With reference now to FIG. 4 of the accompanying drawings, the ultrasonic detector unit A includes transmitting head AT and receiving head AR, while detector unit B includes transmitting head BT and receiving head BR. These transmitting heads AT and BT transmit pulses of ultrasonic frequency towards the pavement forming the cashier's exit lane, and, the receiver heads AR and BR receive these pulse transmissions, from transmitters AT and BT respectively, when reflected from either the pavement or from a vehicle situated within the detecting zone formed by the detector units A and B.

More specifically, suitable Ultrasonic Transmitting and Receiving Apparatus 18 is provided, and is assumed here to be of any suitable form well known in the art, capable of generating the ultrasonic pulses to be transmitted by transmitting heads AT and BT, and furthermore including relays RAG, RAV, RBG and RBV which register whether or not the ultrasonic pulses being received by the receiver heads AR and BR have been reflected from the pavement or from an intervening vehicle. Thus, with no vehicle located under either detector A or detector B, it is assumed that relays RAG and RBG are both dropped away and relays RAV and RBV of FIG. 4 are both picked up (as shown); whereas, if a vehicle is located under detector unit A, the relay RAG will become picked up (relay RAV becomes dropped away), and, if a vehicle is underneath the detector unit B, the relay RBG picks up (relay RBV becomes dropped away). It should furthermore be understood at this time that the detector units A and B are spaced from one another by a predetermined distance that is less than the length of the shortest vehicle to be detected.

It will be noted in FIG. 4 that with no vehicle present at the cashiering location (relays RAV and RBV picked up, as shown), the relay DO is maintained in a picked up position by a stick circuit extending from (+), through back contact 19 of relay RAG, front contacts 20 and 21 of relays RAV and DO respectively, through the lower or hold winding of relay DO, and to (−), while relay DI is also normally maintained in a picked up position by a similar stick circuit includng back contact 22 of relay RBG and front contacts 23 and 24 of relays RBV and DI respectively.

In describing how the apparatus shown in FIG. 4 operates to detect the number and direction of travel of all vehicles utilizing the cashier's lane illustrated in FIG. 1, it will now be assumed that a vehicle begins to exit from the illustrated parking area 11, in FIG. 1, so that it first passes underneath detector unit A and thereby causes relay RAG to become picked up and relay RAV to be dropped away. The resultant opening of back contact 19 and front contact 20 of relays RAG and RAV respectively causes drop away of the relay DO to register that a vehicle has entered the detection zone travelling in an outbound or exiting direction (from left to right in FIG. 4). With relay DO now dropped away, it closes its back contact 25 to thereby insure that relay DI remains in its normal picked up position even when the vehicle subsequently passes under detector unit B.

This picking up of relay RAG and dropping away of relay RAV also causes count relay C to be energized over a circuit including front contact 26 of relay RAG, and back contacts 27 and 28 of relays RAV and DO respectively. After once picking up, the relay C is retained, until the exiting vehicle passes under detector unit B, by a stick circuit including its own front contact 29, front contact 30 of relay DI, back contact 31 of relay RBV, and front contact 32 of relay RBG. Furthermore, with relay C picked up, its repeater relay CP is picked up over front contact 33 of relay C, and, at the same time, capacitor 34 is charged through resistor 35.

With the exiting vehicle under detector unit A and relay DO dropped away, the no count relay NC is also energized over a circuit extending from (+), through front contact 36 of relay RAG, back contact 37 of relay RBG, back contact 38 of relay DO, resistor 39 and to (−). However, capacitor 40 now also becomes energized over back contact 41 of relay NC, and, this capacitor 40 is preselected to have a value such that it initially forms a shunt in multiple with the winding of relay NC, and, requires a predetermined time before it will charge to a voltage value sufficient to permit pick up of the relay NC; i.e. the relay NC is made slow to pick up, for reasons to be discussed hereinafter. Assuming now that this exiting vehicle continues in the exiting direction and thereby comes into position wherein it lies beneath both detector units A and B, the relays RBG and RBV will also be reversed from their normal illustrated operating positions; i.e. relay RBG will become picked up and relay RBV will drop away.

It has been assumed here that the ultrasonic detector units A and B are so mounted with respect to the cashiering lane, of FIG. 1, that a vehicle lies beneath both detector units, when in proper position to pay its required parking charge. With reference once again to FIG. 4, when the assumed vehicle is under both detector units A and B; i.e. is detected at the cashiering location, the relay XP is thus picked up by a circuit including front contact 42 of relay RBG, back contact 43 of relay RBV, and back contact 44 of relay DO. As will be pointed out hereinafter, the picking up of relay XP registers that an exiting vehicle has been detected at the cashiering location, so that the cashiering apparatus may then be rendered operative to register receipt of the parking charge for the vehicle.

Subsequently, should be assumed vehicle then continue to exit from the parking facility so that it passes from beneath detector unit A, relay RAG in FIG. 4 will become dropped away and relay RAV will return to its normal picked up position, since the energy pulses from transmitter AT are no longer being reflected from the vehicle, and similarly, when the exiting vehicle passes from under detector unit B, the relay RBG is dropped away and the relay RBV is returned to its picked up position to indicate that the exiting vehicle has now left the parking facility. In FIG. 4, it should be noted that this picking up of relay RBV and dropping the relay RBG interrupt the previously discussed stick circuit for counting relay C at both back contact 31 of relay RBV and front contact 32 of relay RBG; which stick circuit is employed to maintain the counting relay C in its picked up position until after the vehicle completely exits from the ultrasonic detection zone at the cashiering location.

In accordance with the dropping away of counting relay C, its front contact 33 is opened to thereby deenergize the repeater relay CP which, however, is made somewhat slow releasing due to the voltage previously charged on capacitor 34. Consequently, for a short, predetermined interval of time, the relay CP is retained, after relay C becomes dropped away, and thereby completes an energizing circuit to the Forward Vehicle Counter 45, extending over front contact 46 of relay CP, and back contacts 47, 48 and 49 of relays C, NC and DO respectively. This momentary energization of the counter 45 causes such counter to register an increase of one, in the number of vehicles counted as having exited from the parking facility, and at the same time, the relay XVL in FIG. 4 is momentarily picked up to indicate that an exiting vehicle has left the ultrasonic detection zone.

After capacitor 34 has discharged for a predetermined time, relay CP returns to its normal dropped away position and the resetting relay RES is picked up over a circuit including back contact 50 of relay RAG, front contact 53 of relay RBV, back contact 54 of relay DO, and back contact 55 of relay CP. In accordance with the subsequent closure of front contacts 56 and 57 respectively of relay RES, the relays DI and DO are energized so as to be reset to their normal picked up positions (the relay DI is already in its picked up position as previously discussed). Once the relays DO and DI are reset, the relay RES is deenergized and returned to its normal dropped away position.

On the other hand, if a vehicle should attempt to enter the parking facility through the illustrated exit lane of FIG. 1, the vehicle will first pass under detection unit B and relay RBG in FIG. 4 will become picked up and relay RBV will become dropped. Consequently, the relay DI would become dropped away to register that a vehicle has entered the detection zone travelling in the inbound or entering direction (from right to left in FIG. 4); i.e. a vehicle is attempting to enter the parking facility through the exit lane. More specifically, the relay DI becomes dropped away due to the opening of back contact 22 and front contact 23 of relays RBG and RBV respectively; whereas, the relay DO remains picked up, and therefore, the relay XP is not picked up to register that a vehicle is at the cashiering location, when this vehicle is under both detecting units. Subsequently, for the short time interval, while the repeater relay CP is in its picked up position and the counting relay C is dropped away, the Reverse Vehicle Counter 58 receives a pulse of energy over back contact 59 of relay DI, to thereby increase the reverse vehicle count. Concurrently, the relay RVL is momentarily picked up to register this wrongful entrance of a vehicle into the parking area 11 of FIG. 1 past the cashier's booth 10.

As previously pointed out, the relay NC, in FIG. 4 is utilized to prevent vehicle count from being increased, either forward or reverse, if the vehicle should partially occupy the detection zone and then back up clear of the zone. More specifically, if a vehicle should start to exit at the cashiering location of FIG. 1, so as to pass under detector unit A, and, then subsequently stops and backs up into the parking area, the relay NC (in addition to relay C and CP as previously described) becomes picked up upon failure of the vehicle to pass under detector unit B within a predetermined time after first moving under unit A. However, once the relay NC is picked up under such conditions, it remains picked up until after repeater relay CP drops away, over a stick circuit including its own front contact 60, front contact 61 of relay CP, and back contacts 37 and 38 of relays RBG and DO respectively. As long as relay NC is picked up, it interrupts the energizing circuit to the Forward Vehicle Counter 45 (at its open back contact 48) and thereby prevents an increase in the forward vehicle count under such conditions. In a similar manner, if a vehicle should begin to enter the parking facility through the exiting location as discussed above, and subsequently, backs up before it reaches the detector unit A, the no count relay NC operates in substantially the same manner to prevent registration of a reverse vehicle count on counter 58, in FIG. 4.

As pointed out previously, the relay XP in FIG. 4 is picked up only as long as an exiting vehicle is situated under both the detector units A and B; i.e. is in proper position to pay its required parking charge at the cashier's booth 10 (see FIG. 1). This relap XP has also been illustrated, for convenience, in FIG. 2A of the accompanying drawings, and, with reference thereto, it will be noted that as long as an exiting vehicle is detected in proper paying position under detector units A and B, this relay XP closes its front contact 62 to thereby pick up its repeater relay XPP. In FIG. 2A, it will be noted, however, that while relay XPP is dropped away, i.e. until an exiting vehicle is detected, capacitors 63 and 64 are each connected in respective charging circuits including back contacts 65 and 66 respectively of relay XPP.

As soon as an exiting vehicle is then detected at the cashiering location and relay XPP is picked up, the closing of its front contact 65 connects the charged capacitor 63 to energize the relay XPSC; whereas, the closing of its front contact 66 connects the charged capacitor 64 to energize the relay XPST. In accordance with the picking up of relay XPSC, a stick circuit is then completed for this relay including back contact 67 of relay CRO, back contact 68 of relay XVL, and its own front contact 69; whereas, the picking up of relay XPST completes a stick circuit for itself including back contacts 70 and 71 of relays TSP and XVL respectively, and its own front contact 72. As will be discussed in more detail hereinafter, this picking up of relay XPSC and the closure of its front contact 73 is necessary before the cash register 14, in FIG. 2B, can be operated to register receipt of the parking charge for the vehicle; whereas, the closure of front contact 74 of relay XPST is required before the time stamping machine 13 shown in FIG. 2A can be operated to stamp the exit time on the parking ticket for the vehicle.

To provide the so-called "one-shot" operation of the cash register 14, the stick circuit for relay XPSC is normally interrupted after each operation of the cash register 14 so as to drop relay XPSC, and, this relay XPSC can thereafter be picked up for a subsequent exiting vehicle only if the capacitor 63 has been recharged (over back contact 65 of relay XPP); i.e. the capacitor 63, when discharging, is capable of providing pick up energy for only a very short predetermined time when a vehicle is first detected. Consequently, the relay XPSC can only be picked up once and the cash register 14 can be rendered operable only once for each exiting vehicle detected at the cashiering location of FIG. 1. Similarly each operation of the time stamp unit 13 interrupts the previously discussed stick circuit for relay XPST, and therefore, the capacitor 64 in FIG. 2A must be recharged (over back contact 66 of relay XPP) after each operation of the time stamp unit 13, in FIG. 2A, before the relay XPST can be picked up to permit the time stamp unit 13 to again be operated, for a subsequent vehicle. In this manner, the cashier's apparatus is only rendered effective once for each vehicle detected at the cashiering location, and, only if the vehicle is detected by relay XP as travelling in the proper exiting direction (in the direction shown by the arrow 12 in FIG. 1).

TIME STAMPING APPARATUS OF FIG. 2A

As mentioned previously, the present invention has been illustrated in the accompanying drawings as embodied in a system for controlling the cashiering operations at the cashier's booth 10, in FIG. 1, where vehicles exiting from the parking area 11 are required to stop and pay a parking charge computed in accordance with the time that elapses between entrance and exit of the vehicle to and from the parking facility. Thus, it has been assumed here that each vehicle entering the parking area 11 will be issued a parking ticket upon which the vehicle entrance time is imprinted, and, a suitable time stamping unit 13 is provided at the cashier's location, shown in FIG. 1, for printing the exiting time on the parking ticket for each vehicle leaving the parking area 11, so that the required parking charge may readily be computed.

As previously discussed, the relay XPST, in FIG. 2A, must be picked up to close its front contact 74 (which registers that a vehicle is in proper exiting position) before the time stamp unit 13 can be operated. Furthermore, the parking ticket for the particular exiting vehicle must be inserted into the time stamping machine 13; for example, in the slot designated by the reference number 75, in FIG. 2A, so as to close the internal contacts 76 of the time stamp machine and thereby complete an energizing circuit to solenoid 77 which causes the printing hammer 78 to be actuated and imprint upon the inserted parking ticket, the exact time and date of exit for the particular vehicle leaving the parking facility.

At the same time that the time stamp is actuated, the relay TSP is energized to open its back contact 70 to thereby interrupt the stick circuit for relay XPST. However, this relay TSP is made somewhat slow picking up to insure that the solenoid 77 has sufficient time within which to become energized and operate the printing hammer 78, before relay XPST drops away. Thus, the dropping of relay XPST provides an indication that the time stamp unit 13 has been actuated to imprint the exit time on the parking ticket for the exiting vehicle.

Also, in accordance with the picking up of relay TSP, the relay TSPS is picked up over a circuit including front contact 79 of relay TSP, and, subsequently is maintained by a stick circuit including its own front contact 80 and back contact 81 of relay XVLP. Accordingly, if the time stamp unit 13 is properly operated for the exiting vehicle, back contact 81a of relay TSPS is opened, and, as will be pointed out in more detail hereinafter, this opening of back contact 81a is one condition that must be met in order to prevent actuation of the alarm bell 82 illustrated in FIG. 2A.

More specifically, this alarm bell 82 becomes energized to provide an audible warning to the cashier that a vehicle has prematurely exited (before the time stamp 13 and cash register 14 have both been operated) when the relay XVL momentarily closes its front contact 83 to register that the vehicle has left the detection zone, if either back contact 81a of relay TSPS or back contact 84 of relay CRS is closed, at that time. As will be discussed, this relay CRS is specifically utilized to register whether or not the cash register 14 has been properly operated to register receipt of the required parking fee from the exiting vehicle.

CASH REGISTERING APPARATUS OF FIG. 2B

Cash registers are well known devices for revenue control and keeping money records, and, have the following well known capabilities: indication of each fee rung up; provision of various accumulators for totaling the fees rung up by each individual cashier as well as the total for all cashiers; sales journal or tape printing; parking ticket and daily business form printing; receipt issue; transaction counting with consecutive number printing on sales journal, receipt, parking ticket, etc.; and, interlocking controls actuated to: (1) lock the register; (2) operate the register to ring up a parking charge; and (3) read and/or reset the various totals in the cash register accumulators.

With reference more particularly to FIG. 2B of the accompanying drawings, the cash register 14 provided in accordance with the illustrated embodiment of the present invention is equipped with a plurality of amount keys or buttons (designated by the reference number 85) which, as is well known in the art, are depressed by the cashier in various combinations in accordance with the fee collected from each exiting vehicle. Additionally, in order to distinguish between the transactions made by each cashier, an individual cashier's key is normally provided on a typical cash register, for each cashier utilizing the cash register, which is depressed by that cashier when operating the register. In the illustrated embodiment of the present invention, it will be assumed that two cashiers hereinafter referred to as cashiers A and B, utilize the cash register 14, in FIG. 2B, and therefore, two such cashier's keys 86 and 87 are shown on the cash register 14 for use by cashiers A and B respectively. A group total cashier key 88 is also provided on the cash register 14 and is operated when reading or resetting the group accumulator which totals the charges rung up by both cashiers.

In accordance with the present invention, suitable microswitches or the like are assumed to be installed within the cash register 14 to detect, for example, which of the amount keys 85 are depressed to ring up a particular parking charge, so that this information will also be transmitted, along control cable 89 between FIGS. 2B and 2A, to the remote fee display unit 16 provided in accordance with the present invention and preferably mounted, as shown in FIG. 1, where it can readily be seen by the driver of an exiting vehicle. More particularly, the remote fee display unit 16 (see FIG. 2A) could be of any suitable form; for example, including a plurality of numbered indicating wheels actuated in agreement with the combination in which the cash register amount keys 85 are depressed, to give a remote indication to the driver concerning the exact amount rung up on the cash register 14. Similarly, microswitches 90 and 91 detect when the cashier keys 86 and 87 respectively are depressed, in accordance with the particular cashier operating the register 14, and, cause selective energization of repeater relays ACR and BCR respectively.

The particular operation performed by the cash register 14 of FIG. 2B is controlled by the position of a so-called lock control leverway, normally provided on cash registers, and designated by the reference number 92 in FIG. 2B. This lock control leverway 92 is movable to a plurality of positions, each associated with a different predetermined cash register operation, as listed in the following tabulation:

| Position of Lock Control Leverway 92 | Associated Operation Performed by Cash Register 14 |
|---|---|
| READ ROW 1 | Print made (on sales journal, etc.) of accumulator total for particular cashier, depending upon which cashier key depressed. |
| RESET ROW 1 | Accumulator for particular cashier reset to zero (after a print is made of particular accumulator total). |
| READ ROW 2 | Print made (on sales journal, etc.) of group accumulator total for both cashiers. |
| RESET ROW 2 | Group accumulator reset to zero (after an appropriate print is made of group accumulator total). |
| LOCKED | Cash register locked in inoperative condition. |
| REGISTER | Cash register in condition to ring up parking charge for a vehicle. |

Various microswitches 92a through 92f are also mounted in the cash register 14 to detect the position of the lock control leverway 92, so that: the switch 92a is closed and relay RGR is picked up as long as the lock control leverway is in the REGISTER position; switch 92b is closed and relay LCKR is picked up when the leverway is in the LOCKED position; switch 92c is closed and relay $$\frac{X}{1}R$$

is picked up when the leverway is in its READ ROW 1 position; switch 92d is closed and relay $$\frac{Z}{1}R$$

is picked up when the leverway is in its RESET ROW 1 position; switch 92e is closed and relay $$\frac{X}{2}R$$

is picked up when the leverway is in its READ ROW 2 position; and, switch 92f is closed and relay $$\frac{Z}{2}R$$

is picked up and when the leverway is in its RESET ROW 2 position.

In accordance with the position of the lock control leverway 92, the particular desired operation of the cash register 14 is completed by the motor 93 which, when energized, causes the cash register 14 to be read, reset or operated to ring up a particular parking charge. In order to energize this motor 93, the solenoid 94 must be energized to close its contact 95, and, in accordance with conventional practice, this solenoid 94 can only be energized when the contacts 96 are closed, to indicate that a parking ticket or some other paper to be imprinted, has been inserted upon the printing table 97 included on the cash register 14. For example, during reading or resetting the cash register, a daily business form of any suitable configuration, would normally be placed on the printing table 97, to keep a record of the total moneys collected by each cashier utilizing the cash register 14. In the drawings, the symbols XX have furthermore been utilized in FIG. 2B to represent that either one of the cashier's keys 86 or 87, or, the group total key 88 must be depressed before the motor 93 is energized to operate the cash register 14, as desired.

For example, if the lock control leverway 92 is in the READ ROW 1 position, and, the cashier's key 86 is depressed, that accumulator which keeps track of the total fees rung up by the cashier A will be read, and the amount accumulated will be printed on the daily business form (not shown) when inserted upon the printing table 97. Similarly, if the lock control leverway is in the RESET ROW 1 position, the operation of motor 93 in accordance with the depression of cashier's key 86 will operate to reset the accumulator which keeps track of the total parking charges rung up by cashier A.

With reference to FIG. 2B, it will be noted that when the lock control leverway 92 is operated to a position other than the REGISTER position, the relay RGR and its repeater relay RGP are both released (as shown), and, the presence of a vehicle at a cashiering location is not required to permit the cash register motor 93 to be energized. More specifically, under the conditions, the closed back contact 98 of relay RGP bypasses the normal vehicle presence requirement, and, permits the solenoid 94 to be energized and close its contact 95. However, when the lock control leverway 92 is in the REGISTER position (repeater relay RGP picked up over front contact 99 of relay RGR), the front contact 73 of relay XPSC, in FIG. 2A, must be closed, as previously discussed, to energize wire 100 extending between FIGS. 2A and 2B, before the solenoid 94 can be energized (assuming a parking ticket is inserted upon the printing table 97). Subsequently, in accordance with the depression of either of the cashier's key 86 or 87, the motor 93 is energized to ring up the parking charges for a vehicle leaving the parking facility.

In accordance with conventional cash registering practice, when the cash register 14 of FIG. 2B is operated to ring up the parking charges for an exiting vehicle: the vehicle's parking ticket will be imprinted with the parking charge rung up; the cash register sales journal (represented at reference number 101 in FIG. 2B) will be imprinted with predetermined information, as will be discussed; and, a receipt will be automatically issued from the cash register, for example, at the slot designated by the reference numeral 102 in FIG. 2B.

A microswitch 103 is provided in the cash register 14 (see FIG. 2B) to become momentarily closed when the motor 93 completes each operation cycle, and, this microswitch 103 when closed is utilized to momentarily pick up relays CRO or RRP in FIGS. 2A and 2B respectively, dependent upon whether or not the lock control leverway 92 is then in the REGISTER position. More specifically, if the cash register 14 is in position to register or ring up a vehicle parking charge, the relay RGP is picked up (as previously discussed) to close its front contact 104 and thereby complete an energizing circuit to the relay CRO in FIG. 2A over wire 105 between FIGS. 2B and 2A so that the relay CRO is also picked up momentarily (when microswitch 103 closes) to indicate that the cash register 14 has been operated to ring up a vehicle parking charge. On the other hand, if the register 14 is operated so as to read or reset the various cashier or group accumulators, the relay RGP will be dropped away, and, upon operation of motor 93 and the closing of microswitch 103, the relay RRP will be momentarily picked up to indicate that the cash register 14 has been read or reset. These relays CRO and RRP are utilized for purposes to be discussed hereinafter.

Referring to FIG. 2B, it should be pointed out at this time that it has furthermore been assumed that the cash register 14, being utilized in accordance with the illustrated embodiment of the present invention, also includes a well known consecutive number accumulator, represented at the reference numeral 106, which is advanced one count each time the motor 93 operates, as detected by microswitch 103. Accordingly, either the microswitch 103 or an additional microswitch 107 (as shown) could be employed to repeat the operation of the consecutive number accumulator 106 by becoming momentarily closed each time the accumulator 106 is advanced, for reasons to be discussed hereinafter.

REMOTE AUDIT RECORDING APPARATUS

In accordance with the particular operation occurring at the cash register 14, a plurality of control wires 108 through 118 in FIG. 2B are selectivtly energized and control the remote audit recorder unit 119 of FIG. 2A, over cable 120 extending between FIGS. 2B and 2A, as will be discussed in more detail hereinafter. More specifically, this remote audit recorder has been shown in detail in FIG. 3 of the drawings, and, is employed in accordance with the present invention to provide a printed record that may be checked against the cash register sales journal (provided at 101 in FIG. 2B) in order to uncover any unusual transactions occurring at the cashiering location.

With reference now to FIG. 3 of the accompanying drawings, the remote audit recorder 119 includes: a time date unit TDU which is assumed here to be synchronized (as represented by the dotted line 121) with the time stamping machine 13 of FIG. 2A, so as to provide a continual registration of the exact time and date; a forward vehicle accumulator FVA which is actuated or advanced one forward vehicle count each time the associated solenoid 122 is energized; a reverse vehicle accumulator RVA which is advanced one reverse vehicle count each time the solenoid 123 is energized; a consecutive number accumulator CNA which is advanced one count each time the solenoid 124 is energized; and, code wheel CW which responds to the operation of a driving motor 125, as will be described. Each of these accumulators (FVA, RVA and CNA), the time date unit TDU, and the code wheel CW is furthermore constructed to serve as a printing head by means of which paper or tape 126 (carried by rollers 127 and 128) is imprinted with the associated registered information, when the printing hammer 129 is operated.

More specifically, this hammer 129 is raised to a printing position, so as to imprint upon the paper or tape 126 the information registered by the various accumulators FVA, RVA and CNA; time date unit TDU; and code wheel CW of the recorder 119, each time the associated printing solenoid 130 is energized over the PRINT line 131 (see FIGS. 2A and 2B). As will be pointed out in detail hereinafter, this PRINT line becomes momentarily energized or pulsed upon the occurrence of any of a plurality of predetermined events; i.e. whenever a vehicle attempts to leave the cashiering location before the cash register 14 has been operated; whenever the cash register 14 is operated with no vehicle present; whenever a reverse vehicle is detected; or, whenever the operating condition of the cash register 14 is changed.

The motor 125 of the recorder 119 (in FIG. 3) is more particularly controlled by an energizing circuit including brush contact 132 which continually makes electrical contact with contact disc 133. At various predetermined points around its periphery, the disc 133 is connectable to wires 134, 135 and 136 to be discussed; and also to wires 108 and 109 of cable 120 which are in turn selectively energized as previously pointed out, in accordance with the existing operating condition of the cash register 14 (see FIG. 2B). This contact disc 133 is furthermore formed to have a notched out portion 137 whereby the motor 125 is energized and rotates the contact disc 133, along with code wheel CW, until the notched out portion 137 lines up with the particular peripheral wire that is energized. In this manner, the code wheel CW is revolved until the associated symbol designation for the energized wire (see FIG. 3) is in proper printing position on the code wheel CW, relative to the paper 126 and printing hammer 129.

As will become apparent hereinafter, the wires 134, 135 and 136 in FIG. 3 are selectively energized depending upon the occurrence of various unusual transactions at the cashiering location, and, the particular information supplied as input to the audit recorder 119 (over cable 138 including wires 134, 135 and 136) will be discussed in detail hereinafter when considering the overall operation of the system.

ILLUSTRATED CONDITIONS

Before considering the detailed operation of the control system provided in accordance with the present invention, a discussion will be set forth describing the normal operating status of the apparatus (as illustrated in the accompanying drawings.

For example, and, with reference to FIGS. 2A and 2B, the cash register 14 is assumed to be in that condition wherein the lock control leverway 92 is in its LOCKED position so as to lock the register 14 against any operation. Therefore, microswitch 92b in FIG. 2B is closed (as shown) to cause energization of the lock relay LCKR which in turn causes its slow pick up repeater relay LKP to be picked up over its front contact 139. Since this relay LCKR is picked up, it furthermore closes its front contact 140 and causes energization of the LOCKED control wire 110 including in cable 120 extending between FIGS. 2B and 2A to the remote audit recorder 119 (see FIG. 2). For reasons previously discussed, the energization of wire 110, in cable 120, obviously causes the motor 125, contact disc 133, and code wheel CW to be in that position wherein the code wheel CW is lined up to have the associated symbol LOCKED in proper printing position relative to the paper 126 and the printing hammer 129. More particularly, the initial energization of the LOCKED control wire 110 in FIGS. 2A and 2B (when the lock control leverway 92 was first placed in its LOCKED position) would have caused the motor 125 to be energized and rotate the contact disc 133 until the notched out portion 137 lines up with the energized wire 110, at which time the motor is deenergized.

As will be pointed out in more detail hereinafter, as soon as the code wheel CW has had sufficient time to be positioned, the PRINT line 131 would have been pulsed and thus would have caused the remote audit recorder 119 to print the proper code symbol LOCKED along with forward and reverse vehicle count, consecutive number count, and exact time and date when the cash register was first placed in its locked condition.

In the accompanying drawings, it has been assumed that the cashier B had last been on duty in the cashier's booth 10 and that the magnetic stick type relay CCR, in FIG. 2B, would thus be in that operation position wherein it closes its back contact 141 and causes pick up of the repeater relay BCP, for purposes to be discussed hereinafter.

With reference furthermore to FIG. 2B, since the repeater relay RGP is dropped away (to indicate that the cash register 14 is not in condition to register receipt of vehicle parking fees), the CLOSED signal lamp portion of the lane control sign 17 would be illuminated over a circuit including back contact 142 of relay RGP. As mentioned previously, this lane control sign 17 is employed in accordance with the present invention, to provide an indication to the driver of the vehicles concerning whether or not it is permissible to utilize the particular cashiering lane illustrated in the accompanying FIG. 1, depending upon whether or not the cash register 14 for this lane is in condition to register receipt of vehicle parking charges.

SYSTEM OPERATION

With the illustrated apparatus in the normal operating conditions discussed above, it will now be assumed that the cashier A comes on duty and relieves cashier B. With the cash register 14 locked in inoperative position, as soon as this new cashier A moves the lock control leverway 92 on the register 14 from its LOCKED position, the relay LCKR is dropped away in accordance with the opening of microswitch 92b. Therefore, the OPEN control wire 111 of cable 120 would now be energized, over back contact 140 of relay LCKR, and, would cause the motor 125 in the remote audit recorder 119 (see FIG. 3) to be energized and rotate the contact disc 133 and code wheel CW until the associated symbol OPEN is in proper printing position relative to the paper 126 and printing hammer 129; i.e. until the notch 137 on disc 133 lines up with the energized wire 111.

Concurrently, the closing of back contact 139 of relay LCKR causes energization of the relay OPP (of FIG. 2B) which is slow pick up, to allow time for the code wheel CW of FIG. 3 to be positioned as discussed above, before it closes its front contact 142 and thereby causes the PRINT wire 131 to receive a pulse of energy from the previously charged capacitor 143. As mentioned previously, whenever the PRINT wire 131 is pulsed, the printing solenoid 130 in FIG. 3 operates the printing hammer 129 to imprint upon the paper 126, the information registered by the various accumulators FVA, RVA and CNA, code wheel CW, and the time date unit TDU, included in the remote recorder 120. From the above, it is seen that as soon as the cashier A unlocks the cash register 14, a print is made at the remote audit recorder 120 of the existing forward and reverse vehicle count, as registered at accumulators FVA and RVA; the symbol OPEN from the code wheel CW; the consecutive number registered by accumulator CNA; and, the exact time and date when the cash register 14 was opened, as indicated by the time date unit TDU. In this manner, a printed record is made concerning the system status and the exact time at which the cash register 14 is placed in operation by the cashier A. One manner in which this print could be made is illustrated by the uppermost printed line L1 on the typical printed record shown in FIG. 5 of the accompanying drawings.

After opening the cash register 14, the cashier A would then normaly insert a daily business form or the like onto printing table 97 and operate the lock control leverway 92 so as to read and/or reset the various accumulators contained in the cash register, as prescribed by the management and the requirements of practice. As previously mentioned, each time the cash register 14 is read or reset, a printed record to this effect is furthermore made at the remote audit recorder 119. For example, if cashier A should desire to reset the accumulator which keeps track of the total parking charges previously registered by himself on cash register 14, he would move the lock control leverway 92 to its RESET ROW 1 position wherein microswitch 92d would be closed to energize relay $$\frac{Z}{1}R$$

Subsequently, when the cashier presses cashier button 85, to energize motor 93 and initiate this resetting operation, the relay ACR in FIG. 2B would become picked up, over the closed microswitch 90, and thereby complete an energizing circuit to the $$\frac{Z}{1}A$$

control wire 114 (included in the cable 120 to the remote audit recorder 119), extending over front contact 144 of relay ACR and front contact 145 of relay $$\frac{Z}{1}R$$

Accordingly, the motor 125 of FIG. 3 would be energized and drive the control disc 133 and the code wheel CW of audit recorder 119 until the notched out portion 137 is lined with the energized control wire 114 and the symbol $$\frac{Z}{1}A$$

is in proper printing position on the code wheel CW.

In accordance with the actuation of the cash register 14 by cashier A, during this resetting operation, the motor 93 in the cash register 14 would be energized and momentarily close microswitch 103, as previously described, to cause momentary pick up of relay RRP over back contact 104 of relay RGP. Upon the resulting momentary closing of front contact 146 of relay RRP, the PRINT line wire 131 extending to the remote audit recorder 119 (shown in FIGS. 2A and 3) is pulsed and causes the printing hammer 130 to be actuated for printing the exiting forward and reverse vehicle count; consecutive number; time and date; and, the symbol $$\frac{Z}{1}A$$

from the code wheel CW, so as to provide a printed record indicating that the cashier A has reset his associated accumulator in the cash register 14. Referring to FIG. 5 of the drawings, the line designated at L3 on the typical printed record or tape 126 represents one manner in which the remote audit recorder 119 might provide a printed registration indicating the occurrence of this resetting operation.

In substantially this same manner, the other of the control wires of the cable 120 in FIGS. 2B and 2A would become selectively energized as the other accumulators of the cash register were read and/or reset, and, would cause motor 125 (see FIG. 3) to be energized to properly position the code wheel CW in the remote recorder 119 of FIG. 3. Furthermore, when the relay RRP subsequently becomes momentarily picked up at the completion of each read or reset operation, the PRINT line 131 would be pulsed to actuate the hammer 129 and imprint upon the paper 126 the appropriate code symbol associated with the particular read or reset operation performed, along with exiting vehicle count, time of day, etc.

After completion of the required reading and resetting operations, the cashier A would then move the lock control leverway 92 into the REGISTER position wherein the cash register 14 is properly conditioned to register receipt of parking charges for vehicles exiting at the cashiering location illustrated in FIG. 1. As mentioned previously, it is only after the lock control leverway 92 is in this REGISTER position, that the microswitch 92a is closed and causes pick up of relay RGR which, in turn, picks up repeater relay RGP over its now closed front contact 99. With front contact 142 of relay RGP now closed, the OPEN signal lamp portion of the lane control sign 17 is illuminated to indicate to exiting vehicles that they may now utilize the cashiering lane illustrated in FIG. 1.

Furthermore, in accordance with the opening of back contact 98 of the picked up relay RGP, the solenoid 94 included in cash register 14 can now only be actuated (to permit the operating motor 93 to be energized, as previously described), if wire 100 in FIGS. 2A and 2B is supplied with energy, over the front contact 73 of relay XPSC in FIG. 2A; i.e. it is now necessary for a vehicle to be in proper exiting position at the cashiering location (under both the detecting units A and B in FIG. 1), so as to cause pick up of the relays XP, XPP and consequently XPSC. However, the cash register 14 may be manually controlled to operate (but only once), as will be described hereinafter, by the bypass push button PB illustrated in FIG. 2A, when no vehicle is present at the cashiering location.

With the cash register 14 in that operating condition wherein it is now ready to register receipt of parking charges for exiting vehicles, the closed front contact 142 of relay RGP also causes the red signal lamp R of traffic light 15 (see FIG. 2A) to be illuminated by a circuit including wire 147 between FIGS. 2B and 2A and back contact 148 of relay CRS.

It will now be assumed that a first vehicle starts to exit from the parking area 11 along the illustrated exiting lane in FIG. 1 and subsequently stops underneath the ultrasonic detector units A and B in proper position adjacent the cashier's booth 10. As previously described, the relay XP (shown in FIGS. 2A and 4) would thus become picked up (to indicate that an exiting vehicle has been detected), over the circuit illustrated in FIG. 4 and including front contact 42 of relay RBG and back contacts 43 and 44 of relays RBV and DO respectively. In accordance with this picking up of relay XP, its repeater relay XPP (see FIG. 2A) is energized, as already discussed, over a front contact 62 of relay XP, and, subsequently closes its own front contact 65 to connect the previously charged capacitor 63 in an energizing circuit for stick relay XPSC; whereas, the closing of front contact 66 of relay XPP causes stick relay XPST to be picked up by the charged capacitor 64.

The cashier A would then take the parking ticket from the driver of the exiting vehicle and insert it into the time stamping unit 13 located in the cashier's booth 10, to thereby close contacts 76 and complete the energizing circuits to both the solenoid 77 (in the time stamping unit) and the relay TSP. As previously mentioned, when the solenoid 77 is energized, the hammer 78 is actuated to its printing position wherein the exact time of exit for the particular vehicle is imprinted upon the parking ticket, so that the cashier A may readily ascertain the proper parking fee required from the driver of the vehicle. As previously pointed out, the relay TSP is employed to indicate whether or not the time stamp 13 is operated for each exiting vehicle, and, is made slow to pick up in order to insure that the time stamping unit has sufficient time within which to become energized, before this relay TSP becomes picked up to open the stick circuit for the stick relay XPST at back contact 70. Furthermore, the closing of front contact 79 of relay TSP causes pick up of its repeater stick relay TSPS, which relay is then held over a previously discussed stick circuit including its own front contact 80 and back contact 81 of relay XVLP in FIG. 2A. Therefore, the relay TSPS, upon picking up, also serves to indicate that the time stamp unit 13 has been properly actuated for the exiting vehicle and accordingly opens its back contact 81a in the energizing circuit to the alarm bell 82 in FIG. 2A. After the parking ticket for the assumed vehicle has been properly stamped with the exiting time, and, the cashier has determined the proper parking fee required, this fee is then collected from the driver of the exiting vehicle and the cash register 14, in FIG. 2B, is then operated to register receipt of the collected parking fee.

More particularly, the cashier A would initially depress the appropriate amount keys 85 on the cash register 14, in accordance with the collected fee, and would then insert the parking ticket upon the printing table 97 so as to close contacts 96 and thereby cause energization of the solenoid 94 (to close its contact 95) over a circuit including: front contact 73 of relay XPSC in FIG. 2A (which registers that a vehicle is detected in the proper exiting position); wire 100 between FIGS. 2A and 2B; and, the now closed contacts of switch 96. Thereafter, the cashier A depresses the appropriate button 86 and, the motor 93 is energized to operate the cash register 14 and ring up the collected parking charge. At the completion of this operation cycle, the microswitch 103 is momentarily closed to supply a pulse of pick up energy to the relay CRO, of FIG. 2A, over a circuit including the closed contact of microswitch 103, front contact 104 of relay RGP, and wire 105 extending between FIGS. 2B and 2A.

It is provided, in accordance with the present invention, that the remote audit recorder 119 in FIG. 2A be actuated, as will be pointed out, to make a print of existing vehicle count, time, date, etc. when the first transaction (registering a vehicle parking charge) is made by a cashier so as to obtain a complete record of the events taking place at the particular cashiering location of FIG. 1. More specifically and with the lock control leverway 92 on the cash register 14 is in its REGISTER position, when the cashier A presses the corresponding cashier's key 86 to ring up the parking fee collected from this first assumed vehicle leaving the parking facility, a circuit is completed for energizing the lower or pick up winding of mag-stick relay CCR in FIG. 2B over front contact 149 of relay RGP and front contact 150 of relay ACR. Therefore, the front contact 151 of mag-stick relay CCR is now closed to cause energization of the A control wire 108 included in cable 120 extending to the remote recorder 119 of FIGS. 2A and 3, so that the driving motor 125 of the remote recorder 119 is energized to rotate the code wheel CW until the code symbol A is in proper printing position; i.e. until the notched out portion 137 of contact disc 133 lines up with the energized control wire 108.

The energization of the lower winding of mag-stick relay CCR furthermore closes its front contact 141 to complete an obvious energizing circuit to relay ACP in FIG. 2B. However, this relay ACP is somewhat slow to pick up, so that the cash register 14 has sufficient time to operate and the motor 125 in the remote recorder 119 has sufficient time to actuate the code wheel CW, as previously discussed, before relay ACP picks up and closes its front contact 152 to connect the previously charged capacitor 153 to the PRINT line 131, and thereby, momentarily pulse the solenoid 130 in FIG. 3 which raises the printing hammer 129 and causes the code symbol A to be imprinted upon the paper 126 along with the existing forward and reverse vehicle counts, the proper consecutive number, and the exact time and date of this first transaction by cashier A. For example, refer to printed line designated at L5 on the typical printed record illustrated in FIG. 5 of the drawings.

As previously pointed out, the relay CRO in FIG. 2A is momentarily picked up when the cash register 14 completes its first operating cycle, in ringing up the parking charge for the first exiting vehicle. In accordance with the opening of back contact 67 of this relay, the stick circuit for relay XPSC is then interrupted and the relay XPSC consequently drops away to open its front contact 73 and thereby prevent another operation of the cash register 14 until a subsequent vehicle is detected. Furthermore, in accordance with the closing of front contact 154 of relay CRO, an energizing circuit is then completed to relay CRS extending from (+), through the normally closed contact 155 of the bypass pushbutton PB, front contact 154 of relay CRO, and to (−). Once the relay CRS is picked up, it is maintained by a stick circuit including its own front contact 156 and back contact 81 of relay XVLP. Furthermore, the picking up of relay CRS closes its front contact 157 to pick up repeater relay CRSP and also opens its back contact 84 connected in multiple with the now opened back contact 81a of relay TSPS, in the energizing circuit to alarm bell 82; i.e. the alarm 82 is in this manner kept silent since both the time stamp 13 and the cash register 14 have been operated for the assumed exiting vehicle. However, if this vehicle had exited past the cashier's booth 10 (as detected by the momentary picking up of relay XVL in FIGS. 2A and 4), before both the time stamp 13 and the cash register 14 have been operated, the alarm 82 would be automatically actuated, over the obvious energizing circuit including front contact 83 of relay XVL.

As mentioned previously, the remote fee display 16 (see FIG. 2A) is controlled over control cable 89, between FIGS. 2B and 2A, to provide a display to the driver of an exiting vehicle, indicating the exact amount rung up by the cashier on the cash register 14. For example, it has been assumed here that this remote display is controlled (over cable 89) by suitable microswitches or the like which respond to the particular amount keys 85 that are depressed, and, which actuate accordingly the numbered indicating wheels (or the like) included in the display unit 16 of FIG. 2A. A lamp 158 is illustrated as being preferably included in the display unit 16 for the purpose of illuminating this fee display only after sufficient time has been provided to permit the mechanism of the display unit 16 to be completely operated in response to the amount rung up on the cash register 14; i.e. it is only after the relay CRSP becomes picked up, that the lamp 158 in the remote fee display 16 is energized (over the now closed front contact 159 of relay CRSP) and the display unit 16 is now illuminated to display to the driver of the exiting vehicle the exact amount rung up on the cash register 14 by cashier A. By providing this remote fee display to the driver, the cashier will hesitate to ring up less than he actually collects for the particular exiting vehicle.

Also accomplished when the relay CRS picks up, is the energization of the green lamp G in the traffic light 15 over a circuit including front contact 142 of relay RGP, wire 147 between FIGS. 2B and 2A, and front contact 148 of relay CRS. This green traffic signal thus indicates to the driver of the exiting vehicle that he may now proceed to completely exit from the illustrated cashiering lane.

As previously pointed out when discussing the operation of the vehicle detecting circuitry of FIG. 4, as soon as this exiting vehicle departs from the ultrasonic detection zone; i.e. its rear end passes from under detector unit B, the forward vehicle counter 45 (in FIG. 4) is supplied with a pulse of energy to advance the counter by one forward vehicle count. At this time, the relay XVL is momentarily picked up to register that the vehicle is completely exited, and, the forward vehicle count accumulator FVA in the remote audit recorder 119 (see FIG. 3) is advanced one forward vehicle count in accordance with the momentary pulsing of solenoid 122 by a circuit including front contact 160 of relay XVL and wire 161.

Referring to FIG. 2A, this momentary picking up of relay XVL furthermore causes energization of its repeater relay XVLP, over its front contact 162, so that the relay XVLP subsequently opens its own back contact 81 and thereby releases the stick relays CRS and TSPS in FIG. 2A. However, it is assumed here that each of these stick relays CRS and TSPS is slow releasing enough to allow time for relay XVL to open its front contact 83, before these stick relays closed their respective back contacts 84 and 81a, and thus prevent unnecessary actuation of the alarm 82. This resultant dropping of relay CRS furthermore closes its back contact 148 and thereby causes the red lamp R in the traffic light 15 to once again be illuminated, so as to indicate to the next exiting car that it should stop at the cashier's booth 10 and pay its required parking charge; and, in addition, the opening of front contact 157 of this relay CRS interrupts the previously discussed pick up circuit for repeater relay CRSP in FIG. 2A. Upon dropping away, this repeater relay CRSP opens its front contact 159 and extinguishes the lamp 158 in the remote fee display 16.

RECORDING OF UNUSUAL TRANSACTIONS

As mentioned previously, the cashiering control system provided in accordance with the present invention also provides that an appropriate print will be made, at the remote audit recorder 119, if certain unusual transactions occur at the cashiering location illustrated in FIG. 1. For example, if an exiting vehicle should completely exit from the cashiering lane of FIG. 1 without the cash register 14 being properly operated to register receipt of a parking charge from the vehicle, the relay XVL will become picked up with the relays CRS and CRSP still in their respective dropped away positions. Accordingly, when repeater relay XVLP picks up over front contact 162 of relay XVL, this repeater relay is then stuck in a picked up position by a circuit including its own front contact 163, back contact 164 of relay CRSP, and back contact 165 of relay NPP.

As a consequence, the NO PAY control wire 136 leading to the remote audit recorder 119 (see FIG. 3) is energized, over back contact 166 of relay CRSP and front contact of relay XVLP, and causes the driving motor 125 to move contact disc 133 and code wheel CW until the notch 137 lines up with the control wire 136, and, the code wheel CW is thus revolved until the code symbol NO PAY is in proper printing position relative to the paper 126 and printing hammer 129. In addition, the slow pick up relay NPP is energized at the same time as the NO PAY control wire 136, and, after its pick up time has elapsed, this relay NPP closes its front contact 168 and supplies a pulse of energy (from the charged capacitor 169) to the PRINT line wire 131 to energize solenoid 130, in the remote recorder 119, and actuate printing hammer 129 to provide a printed record of this NO PAY unusual transaction. This picking up of relay NPP furthermore opens its back contact 165 to interrupt the existing stick circuit for the relay XVLP then drops away to, in turn, cause subsequent dropaway of relay NPP and deenergization of the NO PAY control wire. Referring to FIG. 5 of the drawings, the printed line L6 illustrates how this NO PAY print might appear on a typical record provided by the remote audit recorder.

Under normal exiting conditions; i.e. wherein the vehicle properly pays its required parking charge and the cash register 14 is thus operated to cause pick up of the relay CRS in FIG. 2A before the vehicle leaves the detection zone, the repeater relay CRSP is picked up over front contact 157 of relay CRS and thereby prevents energization of the NO PAY control wire 136 of FIG. 2A. Furthermore, the picking up of relay CRSP opens its back contact 164 and thereby prevents sticking of the relay XVLP in its picked up position, after the relay XVL operates, so that the relay XVLP will also return to its dropped away position, at its normal release time, to thereby open its front contact 163 and, in turn, deenergize relay CRSP.

Another unusual transaction automatically accounted for by the control system of the present invention is that wherein the bypass push button PB of FIG. 2A is depressed to permit the cash register 14 to be operated to register receipt of the required parking charges for a vehicle which pays its fee "on the fly"; i.e. without stopping at the cashier's booth 10 in FIG. 1. Accordingly, the circuitry illustrated in the drawings will operate, as previously discussed, to cause the remote audit recorder 119 to initially provide an appropriate NO PAY print indicating that a vehicle has exited without the cash register 14 being operated.

However, the cashier on duty can subsequently depress the push button PB to close contacts 170, and cause relay XPP to become picked up (to close its front contact 65) and thereby energize stick relay XPSC. Once this relay XPSC is picked up, it closes its front contact 171 to pick up hold relay PBH which, in turn, closes its own front contact 172 and energizes the hold down winding 173 on the push button PB, whereby this push button remains in its depressed condition until relay PBH is dropped away. As soon as front contact 73 of relay XPSC becomes closed, in response to this actuation of push button PB, the solenoid 94 in FIG. 2B can be energized (assuming that the parking ticket for the vehicle has been placed on the printing table 97 to close contacts 96), and, the cash register motor 93 can be operated, as described above, to ring up the collected parking charge for the vehicle. At the completion of this operating cycle, the relay CRO in FIG. 2A is momentarily picked up to open its back contact 67 and thereby release stick relay XPSC which, in turn, opens its front contact 171 to drop relay PBH and release push button PB.

However, prior to this release of push button PB, its contacts 174 would have been closed to energize the NO VEH control wire 135 in FIG. 2A, and accordingly, the motor 125 of the remote audit recorder 119 would operate, as previously discussed, to rotate the code wheel CW until the code symbol NO VEH is in proper printing position; i.e. until the notch 137 is lined up with the control wire 135. Furthermore, relay NVP is energized upon closure of contacts 174 of push button PB, and, after its predetermined pick up time elapses (to allow the remote recorder 119 to be conditioned), relay NVP closes its front contact 175 and thereby supplies a pulse of energy from capacitor 176 to the PRINT line wire 131 so as to actuate the printing hammer 129 in the remote audit recorder. Printed line L7 on the typical printed record shown in FIG. 5 of the drawings illustrates such a NO VEH print.

Still another unusual transaction which is automatically recorded by the remote audit recorder 119, is that which occurs if a vehicle should attempt to enter the parking area 11 (see FIG. 1) through the exit lane adjacent cashier's booth 10. Under such conditions, the relay RVL (shown in FIGS. 4 and 2A) would become momentarily picked up, as previously described, when this reverse vehicle was counted by the apparatus shown in FIG. 4, and, would momentarily close its front contact 177 (shown in FIGS. 2A and 3) to supply a pulse of energy, via wire 178, to the solenoid 123 associated with reverse vehicle accumulator RVA in the audit recorder 119. Furthermore, the closing of front contact 179 of relay RVL (see FIG. 2A) causes pick up of the repeater relay RVLP, which is subsequently provided with a stick circuit including its own front contact 180 and back contact 181 of relay RVLPP.

The resultant closing of front contact 182 of relay RVLP energizes the REV control wire 134 leading to the remote audit recorder 119 and thus causes the motor 125 to rotate the code wheel CW until the symbol REV is in proper printing position, wherein the notched out portion 137 lines up with the control wire 134. In addition picking up of relay RVLP closes its front contact 183 and thereby energizes the slow pick up relay RVLPP which, upon picking up, operates its own front contact 184 to thereby supply a pulse of energy to the PRINT line wire 131, for actuating the printing hammer 129, in FIG. 3, as previously discussed. Printed line L8 on the typical printed record shown in FIG. 5 of the drawings illustrates such a REV print, in accordance with the entrance of a vehicle at the exiting location of FIG. 1. Furthermore, the picking up of relay RVLPP opens its back contact 181 and thereby interrupts the stick circuit for relay RVLP which subsequently drops away and opens its front contact 183 to deenergize relay RVLPP.

As mentioned previously, the remote audit recorder 119 also records a print, if at any time the lock control leverway 92 of the cash register 14 is placed in its LOCKED position to render the cash register inoperative. More specifically, the microswitch 92b, upon closing, energizes relay LCKR to close its front contact 140 and thereby energize the LOCKED control wire 110 leading to the remote audit recorder 119 in FIG. 2A. This in turn causes the code wheel CW (see FIG. 3) to be actuated until the code symbol LOCKED is in proper printing position relative to the paper 126 and printing hammer 129. Furthermore, the closing of front contact 139 of relay LCKR energizes repeater relay LKP which, after its predetermined pick up time has elapsed, closes its front contact 184 and thereby supplies a pulse of energy (from capacitor 185) to the PRINT line wire 131 so as to cause the printing hammer 129 of the audit recorder to be actuated.

In view of the foregoing discussion, it is thus seen that the remote audit recorder 119 provides an accurate and complete printed record of the events taking place at the cashier's location illustrated in FIG. 1, which printed record from the recorder 119 can readily be checked against the conventional sales tape or journal continually provided by the cash register 14 (for example, as represented at reference numeral 101 in FIG. 2B) to reconstruct the total happenings at this cashiering location and thereby uncover any unusual or dishonest transactions at such location. As mentioned previously, a typical portion of the printed record provided by the remote audit recorder 119 is illustrated in FIG. 5 of the accompanying drawings; whereas, a typical portion of the conventional sales journal provided by the cash register 14 is illustrated in FIG. 6.

In order to facilitate the correlation of the printed record 126 provided by the audit recorder 119 with the cash register sales journal 101, the consecutive number accumulator CNA (see FIG. 3) in the remote audit recorder 119 is actuated over control wire 118 to stay in step with the corresponding consecutive number accumulator in the cash register 14 (represented by the reference numeral 106 in FIG. 2B). Accordingly, by printing this consecutive number of both the printed record provided by the remote audit recorder 119 (see FIG. 5), and, on the printed sales journal provided by the cash register 14 (see FIG. 6), these two records can readily be checked against one another as previously discussed. For example, and with reference to FIGS. 5 and 6 of the accompanying drawings, the first transaction by the cashier A, involving the collection and registration of one dollar and five cents in the cash register 14, is designated by the consecutive number 040 on the typical sales journal 101 shown in FIG. 6. Correspondingly, printed line L5 of the typical printed record for the remote audit recorder 119 (see FIG. 5) also includes the consecutive number 040, together with time, date, and the code symbol A, thus indicating that it was at three minutes after eight on the morning of May 19, 1963, that the cashier A completed this first transaction at the cashiering booth 10 shown in FIG. 1.

Without attempting to limit the spirit or scope of the present invention, it has been assumed here that a print is made on the cash register sales journal 101 (see FIG. 6) for each operation at the cash register 14; whereas, a print is made at the remote audit recorder 119 only upon the occurrence of certain predetermined events, such as: upon completion of the first transaction by each cashier; when the cash register is read, reset, opened or locked; and, when an unusual transaction (such as a vehicle exiting without payment) takes place at the cashiering location.

With reference to the accompanying drawings, and particularly to the typical printed record of FIG. 5, it should be noted that the remote audit recorder 119 would also provide an accurate printed record concerning the events that occur at the cashier's booth 10 when the cashier A is relieved by the other cashier B. For example, printed line L10 on the typical remote audit recorder printed record illustrates the print that would be made when the accumulator which keeps track of the total parking fees rung up by cashier B was reset; and, printed line L12 on this typical printed record illustrates the print that would be made when the cashier B makes his first transaction and rings up the parking charges for the first vehicle that exits during his shift.

More particularly, when the cashier's key 87 is operated for the first time, with the cash register in condition to ring up a parking charge; i.e. the relay RGP is picked up, the upper winding of magnetic stick type relay CCR is energized over front contact 149 of relay RGP and front contact 186 of relay BCR. Back contact 151 of relay CCR is therefore now closed to cause energization of the B control wire 109, leading to the remote audit recorder 119, so that the code wheel CW in FIG. 3 would then be operated until the code symbol B is in proper printing position. Furthermore, the closing of back contact 141 of mag-stick relay CCR energizes the slow pick up repeater relay BCP to thereafter close its front contact 187 and supply a pulse of energy (from capacitor 188) to the PRINT line wire 131 and cause printing hammer 129 to be actuated to make an appropriate print on the paper 126. As mentioned previously, this print is illustrated at line L12 on the typical printed record shown in FIG. 5.

Having thus described a cashiering control system as one specific embodiment of the present invention, it is desired to be understood that this form has been selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

I claim:

1. A control system for a cashiering location adjoining an exiting traffic lane in a vehicle facility having normally inoperable fee registering apparatus selectively rendered operable to register receipt of collected fees comprising,
   (a) vehicle presence detector means for entering and leaving ends of an area of the exiting lane adjoining the cashiering location for sensing the presence of vehicles within the area,
   (b) traffic direction sensing means governed by the vehicle detector means for manifesting the direction of travel of each vehicle passing within the area, and
   (c) control means governed by the vehicle detecting means for rendering the registering apparatus operable to register receipt of a vehicle fee only provided it is manifested by the direction sensing means that a vehicle has been detected as having entered the area at the cashiering location while traveling in a direction for leaving the facility.

2. The system according to claim 1 wherein means governed by the detector means and the direction sensing means is provided to permit only a single operation of said registering apparatus for each vehicle detected as having entered the area at the cashiering location while traveling in a direction for leaving the facility.

3. A system for controlling the registration of vehicle fees collected at a cashiering location adjacent an exiting traffic lane in a vehicle facility at which a cashier is employed to collect a fee from each vehicle as it leaves the facility comprising,
   (a) cash registering means at the cashiering location for actuation by a cashier when rendered operable to register receipt of a collected vehicle fee,
   (b) vehicle presence detector means for entering and leaving ends of an area of the exiting lane adjoining the cashiering location for sensing the presence of vehicles,
   (c) vehicle direction sensing means governed by the presence detector means for manifesting the direction of travel of each vehicle passing within the area,
   (d) control means governed by the vehicle detector means for rendering the cash register means operable for actuation by a cashier one time only for each vehicle detected, and
   (e) means for rendering the control means operable only in accordance with the manifestation by the vehicle direction sensing means that a vehicle within the area adjoining the location has entered the area in a direction for leaving the facility.

4. The system according to claim 3 wherein,
   (a) said registering means comprises a cash register having an operating motor effective when energized to cause said cash register to operate and register receipt of a collected fee, and wherein,
   (b) the control means comprises an energizing circuit for said operating motor for operating the motor only when a vehicle is in the process of leaving said facility, as manifested by said vehicle direction sensing means.

5. The combination specified in claim 4 further including manual means effective when manually operated to permit said cash register motor to be energized one time for causing a single operation of said cash register when no vehicle is present at said cashiering location as manifested by said vehicle detector means.

6. A system for monitoring the cashiering operations at a predetermined location in a vehicle facility at which a cashier is employed to collect a fee for each vehicle that uses the vehicle facility as said vehicle is passing through an area adjoining the location in an exiting direction from said facility comprising
(a) vehicle detection means for sensing the direction of travel of each vehicle entering the area,
(b) cash registering means at said location for operation by a cashier to register receipt of a fee collected for each vehicle, and
(c) recording means governed jointly by said vehicle detection means and the operating condition of said cash registering means effective to selectively record; a first distinctive printed symbol if a vehicle passes said location in the exiting direction wthout said cash register being operated; a second distinctive printed symbol if a vehicle passes said location travelling in a direction other than said exiting direction; and a third distinctive printed symbol if said cash registering means is operated when no vehicle is passing said location.

7. In a control system for the cashiering location disposed adjacent an exiting traffic lane of a vehicle facility and at which a cashier is employed for collecting a predetermined fee from each exiting vehicle utilizing said traffic lane, the combination of,
(a) a cash register having locked and unlocked conditions at said location intended to be operable by a cashier to register the exact fee collected from each exiting vehicle only when unlocked,
(b) first traffic control means in approach of said exiting location governed selectively by the locked and unlocked conditions of said cash register effective to permit an exiting vehicle to utilize said traffic lane only provided that said cash register is in an unlocked condition,
(c) vehicle detection means for generating a control signal when said exiting vehicle is adjacent said cashiering location,
(d) cash register control means governed by said vehicle detection means for permitting said cash register to be operated to register receipt of a fee for an exiting vehicle only when an exiting vehicle is sensed as being adjacent said cashiering location, and
(e) second trafic control means effective to permit each exiting vehicle to proceed past said cashiering location only provided that said cash register has been operated to register receipt of a fee collected for that exiting vehicle.

8. The combination specified in claim 7 furthermore including a display device responsive to the operation of said cash register and positioned at said cashiering location remotely from said cash register to provide distinctive display to the driver of an exiting vehicle present at said location indicating the exact fee registered on said cash register when operated by a cashier, whereby said driver may readily detect any disagreement between the fee collected and the fee registered.

9. In a control system for a cashiering location in a parking facility at which parking fees are collected for vehicles as they leave said facility in a predetermined exiting direction, the parking fee for each exiting vehicle being charged in accordance with the elapsed time recorded on a parking ticket issued upon entrance of the vehicle into said parking facility, the combination of,
(a) vehicle detection means for generating a control signal for sensing the presence and direction of travel of each vehicle passing said location,
(b) time stamping means at said cashiering location effective when operated for stamping an exit time record on a vehicle parking ticket,
(c) a cash register at said cashiering location effective when operated for registering receipt of a collected parking fee, and
(d) control means governed by said vehicle detection means for permitting said time stamping means and said cash register to be operated only for vehicles sensed as passing said cashiering location in said exiting direction.

10. The combination specified in claim 9 wherein said time stamping means and said cash register each require input electrical operating energy, and wherein said control means includes energizing circuit means for each of said time stamping means and said cash register completed only when an exiting vehicle is detected at said cashiering location, and wherein means is provided for rendering said time stamping means and said cash register each inoperative after once being operated.

11. The combination specified in claim 9 further including alarm means controlled by said vehicle detection means, said time stamp means and said cash register for providing a suitable warning if an exiting vehicle passes said cashiering location prior to the operaton of both said time stamping means and said cash register.

12. In a system for monitoring the cashiering operations at a predetermined location in a facility at which a cashier is employed to collect predetermined fees for vehicles as they pass said cashiering location, said location being equipped with a cash registering means intended to be operated by a cashier as each vehicle is in the process of passing said location to register receipt of a vehicle fee, the combination of,
(a) vehicle detecting means operable to generate a control signal for each vehicle passing said cashiering location, and
(b) recording means controlled by said vehicle detecting means and said cash registering means for printing predetermined distinctive indicia whenever a vehicle passes said location prior to the operation of said cash registering means to register receipt of a fee collected for that vehicle, and whenever said cash registering means is operated other than to register receipt of a fee collected for a vehicle then passing said cashiering location.

13. The combination specified in claim 12 wherein said recording means includes information registering means operable to register changeable predetermined information, and an energizable printing mechanism effective when energized to produce a printed record of the information then registered by said information registering means.

14. The combination specified in claim 13 wherein said recording means comprises,
(a) first registering means governed by signals generated by said vehicle detection means for registering a count indicative of the number of vehicles that have passed said cashiering location,
(b) second registering means responsive to said cash registering means for registering a count distinctive of the number of times said cash registering means has been operated by a cashier,
(c) third registering means for registering the existing time and date, and
(d) fourth registering means for registering a coded symbol selected in accordance with the existing operating condition of each of said cash registering means and said vehicle detection means, and wherein
(e) said printing mechanism includes a printing solenoid effective when energized to cause printing of the information then registered by each of said first, second, third and fourth registering means.

15. The combination specified in claim 14 wherein means is provided for energizing said printing solenoid whenever a vehicle passes said cashiering location prior to the operation of said cash registering means to register receipt of a fee for that vehicle, and whenever said cash registering means is operated by a cashier at times other than to register receipt of a fee collected for a vehicle then passing said location.

16. A system for monitoring the cashiering operations at a location adjacent an exiting traffic lane in a vehicle facility at which a cashier is employed to collect a fee from each vehicle as it leaves the facility comprising,
- (a) vehicle presence detector means for entering and leaving ends of an area of the exiting lane adjoining the cashiering location for sensing the presence of vehicles,
- (b) vehicle direction sensing means governed by the presence detector means for manifesting the direction of travel of each vehicle passing within the area,
- (c) registering means effective when operated to register the collection at said location of a vehicle fee, and
- (d) recording means governed by said registering means and by said sensing means for providing a record indicative of any vehicle passing said location without operation of said registering means, provided the vehicle passing without registration is passing in a direction to leave the vehicle facility.

17. The system according to claim 16 wherein means is provided for rendering said recording means operable to provide a distinctive record in response to the operation of said registering means when no vehicle is present at said location.

References Cited by the Examiner

UNITED STATES PATENTS 2,989,736   6/1961   Cooper _____ 340—31

NEIL C. READ, *Primary Examiner.*
THOMAS B. HABECKER, *Examiner.*